(12) United States Patent
Sakata

(10) Patent No.: US 10,977,343 B2
(45) Date of Patent: Apr. 13, 2021

(54) DISPLAY INPUT DEVICE FOR RECEIVING PASSWORD INPUT, INFORMATION PROCESSING APPARATUS, DISPLAY INPUT METHOD

(71) Applicant: KYOCERA Document Solutions Inc., Osaka (JP)

(72) Inventor: Hiromi Sakata, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 280 days.

(21) Appl. No.: 16/132,087

(22) Filed: Sep. 14, 2018

(65) Prior Publication Data

US 2019/0087551 A1 Mar. 21, 2019

(30) Foreign Application Priority Data

Sep. 19, 2017 (JP) .............................. JP2017-178917

(51) Int. Cl.
*G06F 21/31* (2013.01)
*G06F 3/0488* (2013.01)
(Continued)

(52) U.S. Cl.
CPC .......... *G06F 21/31* (2013.01); *G06F 3/04845* (2013.01); *G06F 3/04886* (2013.01);
(Continued)

(58) Field of Classification Search
CPC ...... G06F 21/31; G06F 3/04845; G06F 21/46; G06F 21/62; G06F 21/83
See application file for complete search history.

(56) References Cited

U.S. PATENT DOCUMENTS

2003/0110402 A1* 6/2003 Park ..................... G06F 21/83
726/18
2004/0139331 A1* 7/2004 Sanai ..................... G06F 21/46
713/184
(Continued)

FOREIGN PATENT DOCUMENTS

JP 2005018569 A 1/2005

OTHER PUBLICATIONS

Partial machine translation of publication JP 2005-018569 (e.g. Appendix including translation of figures 6 and 7), Aoki Motoyuki, NEC LTD. (Year: 2005).*

*Primary Examiner* — Shanto Abedin
(74) *Attorney, Agent, or Firm* — Alleman Hall Creasman & Tuttle LLP

(57) ABSTRACT

A display input device includes a reception processing portion, a change processing portion, and a display processing portion. The reception processing portion, based on correspondence information indicating a correspondence between a plurality of characters and a plurality of operation keys used for inputting a password of a preset number of characters, receives an operation of any one of the operation keys as an input operation of a character corresponding to the operation key. The change processing portion changes the correspondence relationship when the operation of the operation key is performed a preset specific number of times that is less than the number of characters of the password, or at a preset specific interval. The display processing portion displays the correspondence information at a predetermined position, different from a position of the operation keys, on an input screen used for inputting the password.

10 Claims, 6 Drawing Sheets

(51) Int. Cl.
   *G06F 3/0484* (2013.01)
   *H04N 1/00* (2006.01)
   *H04N 1/44* (2006.01)
(52) U.S. Cl.
   CPC ....... *H04N 1/00384* (2013.01); *H04N 1/4413* (2013.01); *H04N 2201/0094* (2013.01)

(56) References Cited

U.S. PATENT DOCUMENTS

| | | | | |
|---|---|---|---|---|
| 2005/0044425 | A1* | 2/2005 | Hypponen | G07C 9/33 726/19 |
| 2008/0177920 | A1* | 7/2008 | Dennis | G06F 3/0237 710/200 |
| 2008/0258940 | A1* | 10/2008 | Ding | G06F 21/83 341/22 |
| 2013/0047237 | A1* | 2/2013 | Ahn | G06F 21/36 726/7 |
| 2014/0033090 | A1* | 1/2014 | Yamada | G06F 3/0484 715/764 |
| 2014/0068754 | A1* | 3/2014 | Burkill | G06F 21/36 726/18 |
| 2015/0309724 | A1* | 10/2015 | Wu | G06F 3/04886 715/773 |
| 2015/0324113 | A1* | 11/2015 | Kapp | G06F 3/0481 715/863 |
| 2015/0365234 | A1* | 12/2015 | Marten | G06F 21/36 713/183 |
| 2016/0063228 | A1* | 3/2016 | Fang | G06F 3/0482 726/19 |
| 2016/0065562 | A1* | 3/2016 | Guo | G06F 3/0236 726/5 |
| 2016/0196002 | A1* | 7/2016 | Kuge | G06F 3/0412 345/178 |

\* cited by examiner

DISPLAY INPUT DEVICE FOR RECEIVING PASSWORD INPUT, INFORMATION PROCESSING APPARATUS, DISPLAY INPUT METHOD

INCORPORATION BY REFERENCE

This application is based upon and claims the benefit of priority from the corresponding Japanese Patent Application No. 2017-178917 filed on Sep. 19, 2017, the entire contents of which are incorporated herein by reference.

BACKGROUND

The present disclosure relates to a display input device, an information processing apparatus including the display input device, and a display input method that is executed in the display input device.

In the information processing apparatus such as a personal computer, an authentication process for authenticating a user is executed. In this type of information processing apparatus, when the authentication process is executed, an input screen used for inputting a password is displayed on a display portion. Based on a password input on the input screen, it is determined whether or not authentication is successful.

Meanwhile, when a user inputs the password into the information processing apparatus, the password may become known to a third party from movement of the user's hand entering the password. On the other hand, there is a configuration known as a related technology in which correspondence relationship information indicating a correspondence relationship between a plurality of operation keys and a plurality of characters is displayed on the display portion, and based on the correspondence relationship information, the character that is input in response to an operation of any of the operation keys is identified.

SUMMARY

A display input device according to an aspect of the present disclosure includes a reception processing portion, a change processing portion, and display processing portion. The reception processing portion, based on correspondence relationship information indicating a correspondence relationship between a plurality of characters and a plurality of operation keys used for inputting a password of a preset number of characters, receives an operation of any one of the operation keys as an input operation of a character corresponding to the any one of the operation keys. The change processing portion changes the correspondence relationship when the operation of the any one of the operation keys is performed a preset specific number of times that is less than the number of characters of the password, or at a preset specific interval. The display processing portion displays the correspondence relationship information at a predetermined position, different from a position of the operation keys, on an input screen used for inputting the password.

An information processing apparatus according to another aspect of the present disclosure includes the display input device.

A display input method according to a further aspect of the present disclosure includes: receiving, based on correspondence relationship information indicating a correspondence relationship between a plurality of characters and a plurality of operation keys used for inputting a password of a preset number of characters, an operation of any one of the operation keys as an input operation of a character corresponding to the any one of the operation keys; changing the correspondence relationship when the operation of the any one of the operation keys is performed a preset specific number of times that is less than the number of characters of the password, or at a preset specific interval; and displaying the correspondence relationship information at a predetermined position, different from a position of the operation keys, on an input screen used for inputting the password.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[Schematic Configuration of Image Processing Apparatus 10]

Figure 1:
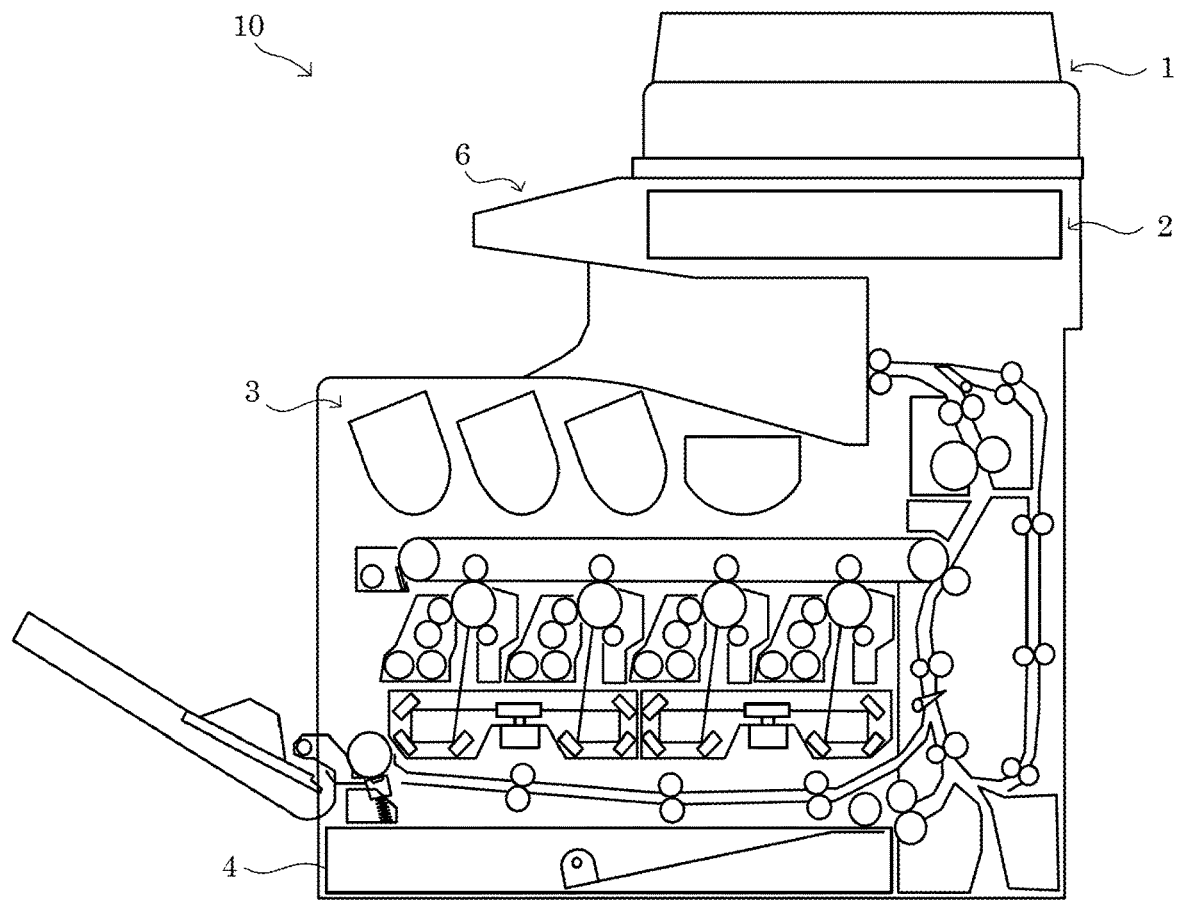
FIG. 1 is a diagram showing a configuration of an image processing apparatus according to an embodiment of the present disclosure.
Figure 2:
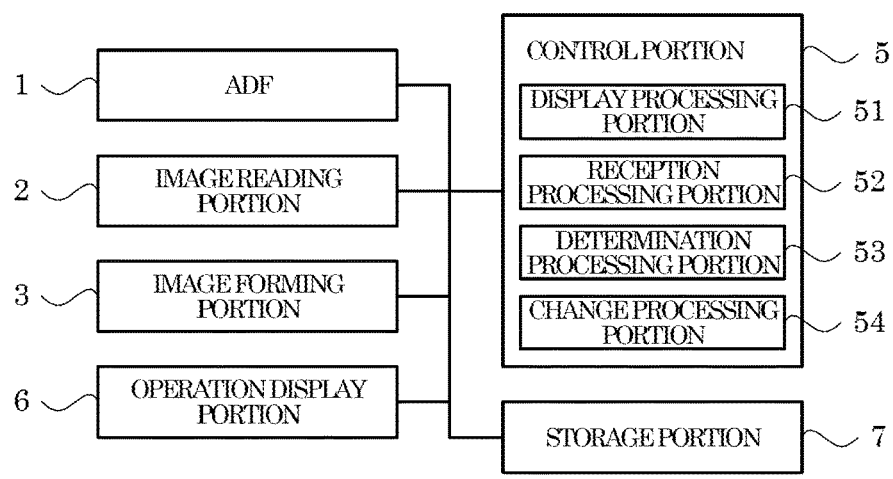
FIG. 2 is a block diagram showing a system configuration of the image processing apparatus according to the embodiment of the present disclosure.

First, with reference to FIG. 1 and FIG. 2, a schematic configuration of an image processing apparatus 10 according to an embodiment of the present disclosure is described. Here, FIG. 1 is a schematic cross-sectional diagram showing the configuration of the image processing apparatus 10.

The image processing apparatus 10 is a multifunctional peripheral having a plurality of functions, such as a scanning function for reading image data from a document sheet, a printing function for forming an image based on the image data, a facsimile function, and a copying function. Here, the image processing apparatus 10 is an example of the information processing apparatus according to the present disclosure. It is noted that the image processing apparatus 10 may also be a scanner apparatus, a printer apparatus, a facsimile apparatus, a copier, a personal computer, and an ATM (Automated Teller Machine).

As shown in FIG. 1 and FIG. 2, the image processing apparatus 10 includes an ADF (Automatic Document Feeder) 1, an image reading portion 2, an image forming portion 3, a sheet feeding portion 4, a control portion 5, an operation display portion 6, and a storage portion 7.

The ADF 1 conveys a document sheet to be read by the image reading portion 2. Specifically, the ADF 1 includes a document sheet setting portion, a plurality of conveyance rollers, a document sheet holder, and a sheet discharge portion.

The image reading portion 2 can read image data from the document sheet. Specifically, the image reading portion 2 includes a document sheet table, a light source, a plurality of mirrors, an optical lens, and a CCD.

The image forming portion 3 can electrographically form a color or monochrome image based on the image data read by the image reading portion 2. In addition, the image forming portion 3 can also form an image based on image data input from an information processing apparatus such as an external personal computer. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. It is noted that the image forming portion 3 may also form an image by another image forming method such as an ink jet method.

The sheet feeding portion 4 supplies a sheet to the image forming portion 3. Specifically, the sheet feeding portion 4 includes a sheet feeding cassette and a plurality of conveyance rollers. In the image processing apparatus 10, the color or monochrome image is formed on the sheet supplied from the sheet feeding portion 4, and the sheet on which the image has been formed is discharged to the sheet discharge tray.

The control portion 5 includes control devices such as a CPU, a ROM, a RAM, and an EEPROM, all of which are not shown. The CPU is a processor for executing various types of arithmetic processing. The ROM is a nonvolatile storage device in which information, such as a control program for the CPU to execute the various types of processing, is preliminarily stored. The RAM is a volatile storage device, and the EEPROM is a nonvolatile storage device. The RAM and the EEPROM are used as temporary storage memory (work area) for the various types of processing executed by the CPU. In the control portion 5, various types of control programs, preliminarily stored in the ROM, are executed by the CPU. This allows for the image processing apparatus 10 to be integrally controlled by the control portion 5. It is noted that the control portion 5 may also be constituted by an electronic circuit such as an integrated circuit (ASIC), and may be provided separately from a main control portion that integrally controls the image processing apparatus 10.

The operation display portion 6 includes a display portion, such as a liquid crystal display, for displaying various types of information in response to a control instruction from the control portion 5, and an operation portion, such as a touch panel, for inputting various types of information to the control portion 5 in response to an operation from a user.

The storage portion 7 is a storage device such as an SSD (Solid State Drive) or an HDD (Hard Disk Drive). It is noted that the storage portion 7 may also be the EEPROM of the control portion 5.

A password used for user authentication is stored in the storage portion 7. Here, the password is a character string constituted by a preset number of characters. Specifically, the characters are numbers, and it is noted that the characters may also be alphabetic characters. In addition, the characters may also include numbers, alphabetic characters, and symbols. In addition, the password may be set for each user, and for each group that includes a plurality of users.

In the image processing apparatus 10, an authentication process (see flowchart in FIG. 5) for authenticating a user is executed. Specifically, in the ROM of the control portion 5, an authentication program for the CPU of the control portion 5 to execute the authentication process is preliminarily stored. It is noted that the authentication program is recorded in a computer-readable recording medium such as a CD, a DVD, or a flash memory, and may be installed from the recording medium to a storage device such as the storage portion 7.

The control portion 5, as shown in FIG. 2, includes a display processing portion 51, a reception processing portion 52, a determination processing portion 53, and a change processing portion 54. Specifically, the CPU of the control portion 5 executes the authentication program stored in the ROM. With this configuration, the control portion 5 functions as the display processing portion 51, the reception processing portion 52, the determination processing portion 53, and the change processing portion 54. Here, the configuration including the control portion 5 and the operation display portion 6 is an example of the display input device according to the present disclosure.

The display processing portion 51 displays an input screen G10 (see FIG. 3), used for inputting the password, on the operation display portion 6. For example, the display processing portion 51 displays the input screen G10 on the operation display portion 6 when the image processing apparatus 10 is turned on, when the image processing apparatus 10 returns to a normal mode from a sleep mode in which some functions were stopped, and when a user operation instructs for the input screen G10 to be displayed. Here, the input screen G10 is an example of the input screen in the present disclosure.

In addition, the display processing portion 51 displays correspondence relationship information, indicating a correspondence relationship between the plurality of the characters and operation keys G110 to G119 (see FIG. 3) for inputting the password, on the input screen G10. Specifically, the display processing portion 51 displays the correspondence relationship information at a predetermined position on the input screen G10 that is different from a position of the operation keys G110 to G119.

For example, the display processing portion 51 may display the correspondence relationship information horizontally centered and on a lower side in a vertical direction of the input screen G10. This prevents the correspondence relationship information from being seen by a third party, in a case where the third party is behind a user operating the image processing apparatus 10.

Figure 3:
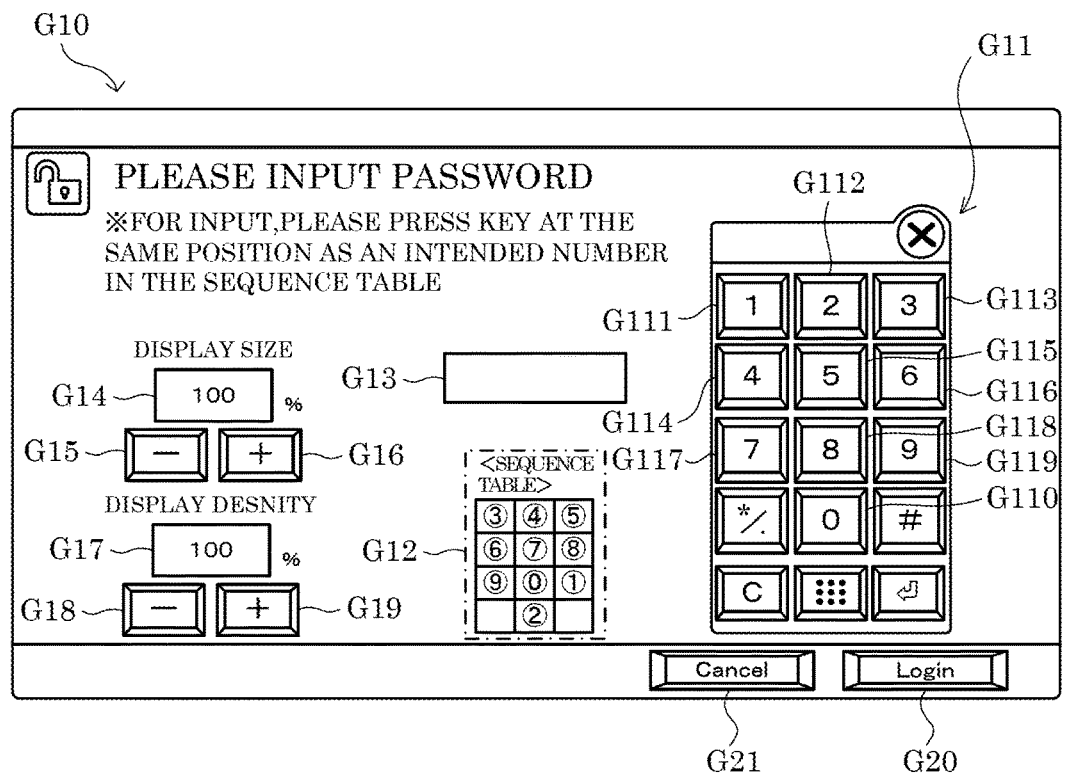
FIG. 3 is a diagram showing an example of an input screen displayed in the image processing apparatus according to the embodiment of the present disclosure.

Here, the input screen G10 is described with reference to FIG. 3. As shown in FIG. 3, the input screen G10 includes an operation key group G11, a correspondence relationship information display portion G12 (surrounded by a dashed line in FIG. 3), a password input field G13, a display size display field G14, operation keys G15 to G16, a display density display field G17, operation keys G18 to G19, a login key G20, and a cancel key G21.

The operation key group G11 is used for inputting the characters constituting the password. Specifically, the operation key group G11 is a so-called ten key. As shown in FIG. 3, the operation key group G11 includes the operation keys G110 to G119. Below, the operation keys G110 to G119 are collectively referred to as operation keys G11X.

It is noted that the operation key group G11 may not be included in the input screen G10. For example, the operation display portion 6 may be provided with a plurality of operation keys composed of hard keys instead of the operation key group G11.

The correspondence relationship information is displayed in the correspondence relationship information display portion G12. The correspondence relationship information, as shown in FIG. 3, may be graphic information in which the plurality of characters are arranged on a plurality of squares, representing where the operation keys G11X are positioned in the operation key group G11. For example, in the case of the correspondence relationship information shown in FIG. 3, the characters corresponding to the operation keys G111, G115, and G119 are "3", "7", and "1", respectively.

For example, when the input screen G10 is displayed on the operation display portion 6, the display processing portion 51 uses random numbers to generate the correspondence relationship information, such that the characters corresponding to the operation keys G11X are randomly selected. In addition, the display processing portion 51 stores the generated correspondence relationship information in a predetermined first storage area of the RAM. In addition, the display processing portion 51 displays the correspondence relationship information, stored in the first storage area, in the correspondence relationship information display portion G12 on the input screen G10.

Each of the characters input on the input screen G10 is replaced by a predetermined symbol and displayed in the password input field G13. For example, the symbol may be "k" (asterisk) (see FIG. 4).

In the display size display field G14, a display size of the correspondence relationship information is displayed. As shown in FIG. 3, in the display size display field G14, the display size of the correspondence relationship information is indicated by a percentage. In the correspondence relationship information display portion G12 shown in FIG. 3, the correspondence relationship information is displayed in a state where the display size is 100 percent.

The operation keys G15 to G16 are used for changing the display size of the correspondence relationship information. Specifically, the operation keys G15 and G16 are respectively used for enlarging and reducing the display size of the correspondence relationship information.

The display processing portion 51, in response to an operation of the operation keys G15 to G16, changes the display size of the correspondence relationship information displayed on the input screen G10. For example, the display processing portion 51, in response to an operation of the operation key G15, may decrease the display size indicated in the display size display field G14 in 1 percent increments, and reduce the correspondence relationship information displayed in the correspondence relationship information display portion G12 in accordance with the decreased display size. In addition, the display processing portion 51, in response to an operation of the operation key G16, increases the display size indicated in the display size display field G14 in 1 percent increments, and enlarges the correspondence relationship information displayed in the correspondence relationship information display portion G12 in accordance with the increased display size.

It is noted that the display size display field G14 and the operation keys G15 to G16 may be used for displaying and changing the display size of the operation key group G11. In this case, the display processing portion 51 may change the display size of the operation key group G11 displayed on the input screen G10 in response to an operation of the operation keys G15 to G16. In addition, the display processing portion 51 may change the display size of both the correspondence relationship information and the operation key group G11 displayed on the input screen G10 in response to an operation of the operation keys G15 to G16. In addition, the display size display field G14 and the operation keys G15 to G16 may not be included on the input screen G10.

In the display density display field G17, a display density of the correspondence relationship information is displayed. As shown in FIG. 3, in the display density display field G17, the display density of the correspondence relationship information is indicated by a percentage. In the correspondence relationship information display portion G12 shown in FIG. 3, the correspondence relationship information is displayed in a state where the display density is 100 percent.

The operation keys G18 to G19 are used for changing the display density of the correspondence relationship information. Specifically, the operation keys G18 and G19 are respectively used for decreasing and increasing the display density of the correspondence relationship information.

The display processing portion 51, in response to an operation of the operation keys G18 to G19, changes the display density of the correspondence relationship information displayed on the input screen G10. For example, the display processing portion 51, in response to an operation of the operation key G18, may decrease the display density indicated in the display density display field G17 in 1 percent increments, and reduce the density of the correspondence relationship information displayed in the correspondence relationship information display portion G12 in accordance with the decreased display density. In addition, the display processing portion 51, in response to an operation of the operation key G19, increases the display density indicated in the display density display field G17 in 1 percent increments, and increases the density of the correspondence relationship information displayed in the correspondence relationship information display portion G12 in accordance with the increased display density.

It is noted that the display density display field G17 and the operation keys G18 to G19 may be used for displaying and changing the display density of the operation key group G11. In this case, the display processing portion 51 may change the display density of the operation key group G11 displayed on the input screen G10, in response to an operation of the operation keys G18 to G19. In addition, the display processing portion 51 may change the display density of both the correspondence relationship information and the operation key group G11 displayed on the input screen G10, in response to an operation of the operation keys G18 to G19. In addition, the display density display field G17 and the operation keys G18 to G19 may not be included on the input screen G10.

The login key G20 is used for a confirmation operation for confirming input content on the input screen G10. Specifically, in the image processing apparatus 10, when an operation is performed on the login key G20, it is determined whether or not the user authentication is successful based on the input content that was input on the input screen G10 before the operation of the login key G20.

The cancel key G21 is used for an ending operation for ending the input screen G10 displayed on the operation display portion 6. For example, in the image processing apparatus 10, when an operation is performed on the cancel key G21, an initial operation screen for a non-login user may be displayed on the operation display portion 6.

The reception processing portion 52, based on the correspondence relationship information, receives an operation of the operation key G11X as an input operation of a character corresponding to the operation key G11X.

For example, when the operation keys G111, G115, and G119 are operated on the input screen G10 shown in FIG. 3, the reception processing portion 52, based on the correspondence relationship information, respectively receives the operations of the operation keys G111, G115, and G119 as input operations of the characters "3", "7", and "1" that correspond to the respective operation keys.

For example, the reception processing portion 52 may sequentially store input characters in a second storage area in the RAM that is different from the first storage area.

Here, when an operation key G11X is operated, the display processing portion 51 displays, during a preset display time, a character in the correspondence relationship information that corresponds to the operation key G11X, in a way that the character is distinguishable from the other characters. For example, the display time may be one second. It is noted that the display time may be arbitrarily set according to a user operation on the operation display portion 6.

For example, when an operation key G11X is operated, the display processing portion 51 may change, during the display time, the display density of a character in the correspondence relationship information that corresponds to the operation key G11X. It is noted that the display processing portion 51 may change, during the display time, a display color of a character in the correspondence relationship information that corresponds to the operation key G11X. In addition, during the display time, the display processing portion 51 may invert the density of the square area of the character in the correspondence relationship information that corresponds to the operation key G11X.

It is noted that the display processing portion 51 may not execute the processing described above for changing a display mode of the character, during the display time, when the operation key G11X is operated.

When the confirmation operation is performed, the determination processing portion 53 determines whether or not the user authentication is successful, based on a character string constituted by the input characters received by the reception processing portion 52. For example, the confirmation operation is the operation of the login key G20.

Specifically, when the character string constituted by the characters stored in the second storage area of the RAM matches the password stored in the storage portion 7, the determination processing portion 53 determines that the user authentication is successful.

It is noted that when the determination processing portion 53 determines that the user authentication is successful, the control portion 5 executes a login process for logging in the user to the image processing apparatus 10.

Here, in a case where the correspondence relationship information displayed on the operation display portion 6 has been memorized by a third party, there is a risk that the password may leak to the third party from the movement of the user's hand inputting the password. On the other hand, as described below, in the image processing apparatus 10 according to the embodiment of the present disclosure, it is possible to prevent leakage of the password to a third party from the movement of the user's hand inputting the password.

The change processing portion 54 changes the correspondence relationship when an input operation of the operation key G11X is performed a preset specific number of times that is less than the number of characters of the password.

For example, the specific number of times may be one. It is noted that the specific number of times may be a number that is arbitrarily set according to a user operation on the operation display portion 6. In addition, the specific number of times may be obtained by dividing the number of characters of the password stored in the storage portion 7 by a predetermined number of 2 or more.

Specifically, when the input operation of the operation key G11X has been performed the specific number of times, the change processing portion 54 changes the correspondence relationship after the display time has elapsed from the last operation of the operation key G11X.

For example, the change processing portion 54 may change the correspondence relationship information stored in the first storage area of the RAM using random numbers, such that the characters corresponding to the operation keys G11X are randomly selected.

Here, when the correspondence relationship is changed by the change processing portion 54, the display processing portion 51 displays on the input screen G10 the correspondence relationship information indicating the correspondence relationship after the change.

Figure 4:
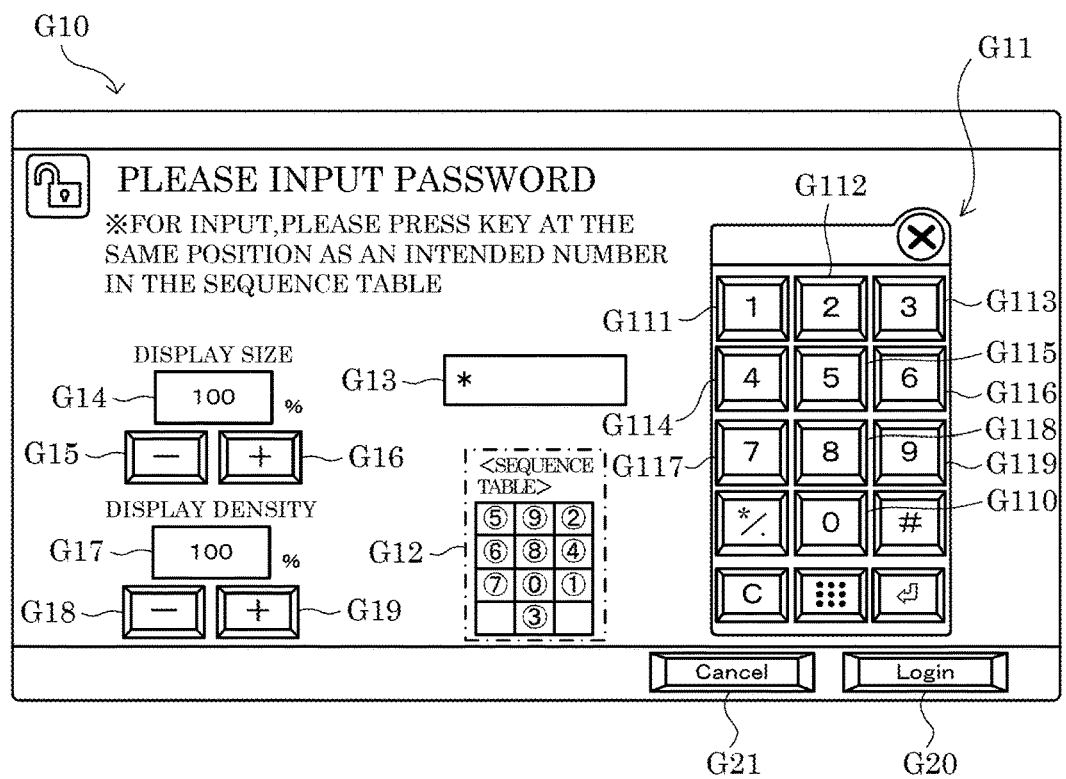
FIG. 4 is a diagram showing an example of an input screen displayed in the image processing apparatus according to the embodiment of the present disclosure.

FIG. 4 shows an example of a change of the correspondence relationship by the change processing portion 54. Specifically, following an operation of the operation keys G11X on the input screen G10 shown in FIG. 3, the input screen G10 shown in FIG. 4 is displayed. The input screen G10 shown in FIG. 4 is different from the input screen G10 shown in FIG. 3 in display content of the correspondence relationship information display portion G12, namely, the correspondence relationship information. For example, in the correspondence relationship information shown in FIG. 4, the characters corresponding to the operation keys G111, G115, and G119 are "5", "8", and "1", respectively.

It is noted that the change processing portion 54 may change the correspondence relationship at a preset specific interval. For example, the specific interval may be 10 seconds. It is also noted that the specific interval may be arbitrarily set according to a user operation on the operation display portion 6.

[Authentication Process]

Figure 5:
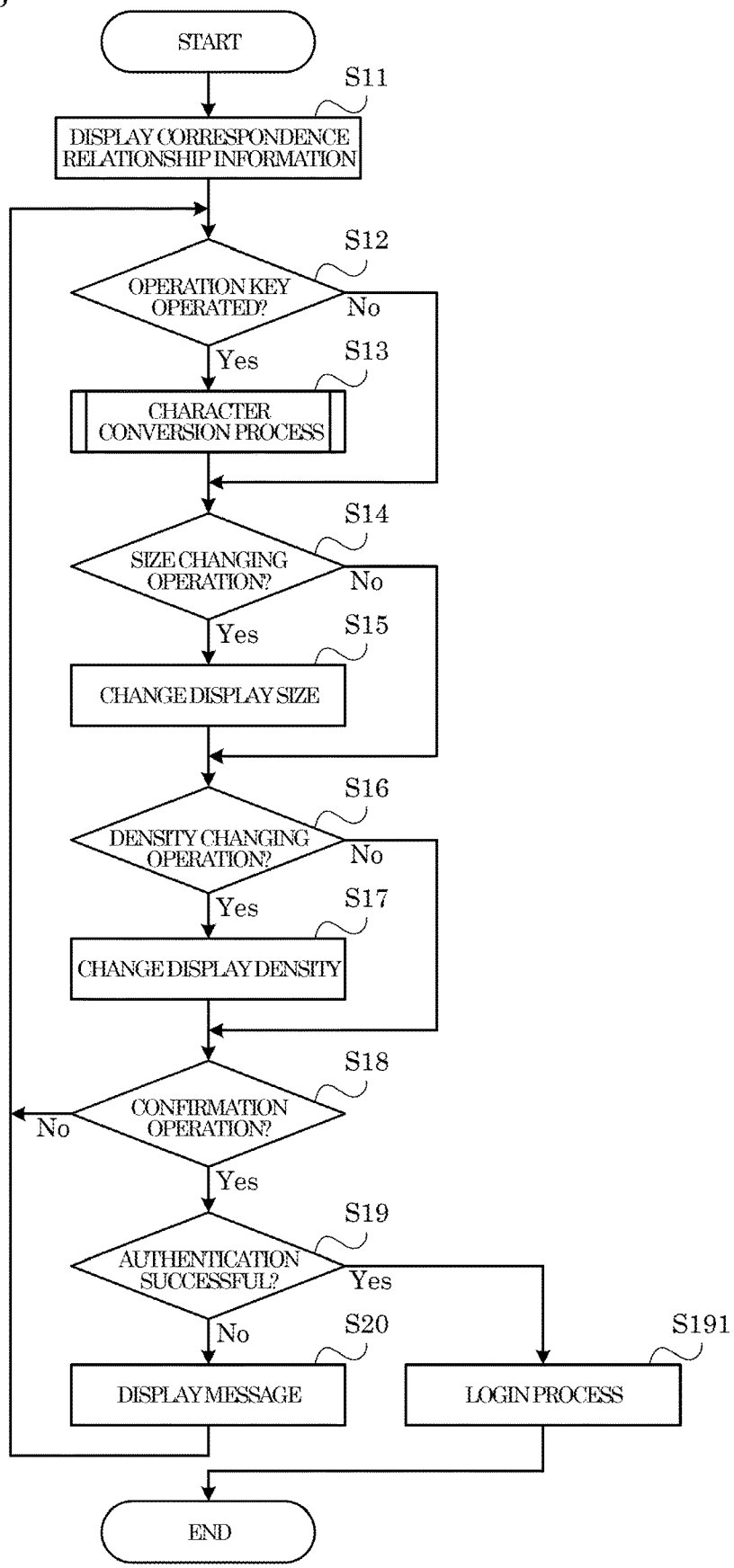
FIG. 5 is a flowchart showing an example of an authentication process executed in the image processing apparatus according to the embodiment of the present disclosure.

In the following, an example procedure of the authentication process executed in the image processing apparatus 10 by the control portion 5 is described with reference to FIG. 5. Here, steps S11, S12 . . . indicate the numbers of processing procedures (steps) executed by the control portion 5. For example, the control portion 5 may execute the authentication process when the image processing apparatus 10 is turned on, when the image processing apparatus 10 returns to the normal mode from the sleep mode in which some functions were stopped, and when the user operation instructing for the input screen G10 to be displayed is performed.

<Step S11>

First, in step S11, the control portion 5 displays the input screen G10 on the operation display portion 6 and displays the correspondence relationship information in the correspondence relationship information display portion G12 of the input screen G10. Here, the processing in step 11 is executed by the display processing portion 51 of the control portion 5.

For example, the control portion 5 uses random numbers to generate the correspondence relationship information such that the characters corresponding to the operation keys G11X are randomly selected. The control portion 5 then stores the generated correspondence relationship information in the first storage area of the RAM. In addition, the control portion 5 displays the correspondence relationship information, stored in the first storage area, in the correspondence relationship information display portion G12 of the input screen G10.

<Step S12>

In step S12, the control portion 5 determines whether or not an operation of the operation key G11X has been detected on the input screen G10 displayed in step S11.

Here, when the control portion 5 determines that an operation of the operation key G11X has been detected (Yes in S12), the control portion 5 moves the process to step S13. In addition, when an operation of the operation key G11X has not been detected (No in S12), the control portion 5 moves the process to step S14.

<Step S13>

In step S13, the control portion 5 executes an input receiving process described below.

[Input Receiving Process]

Figure 6:
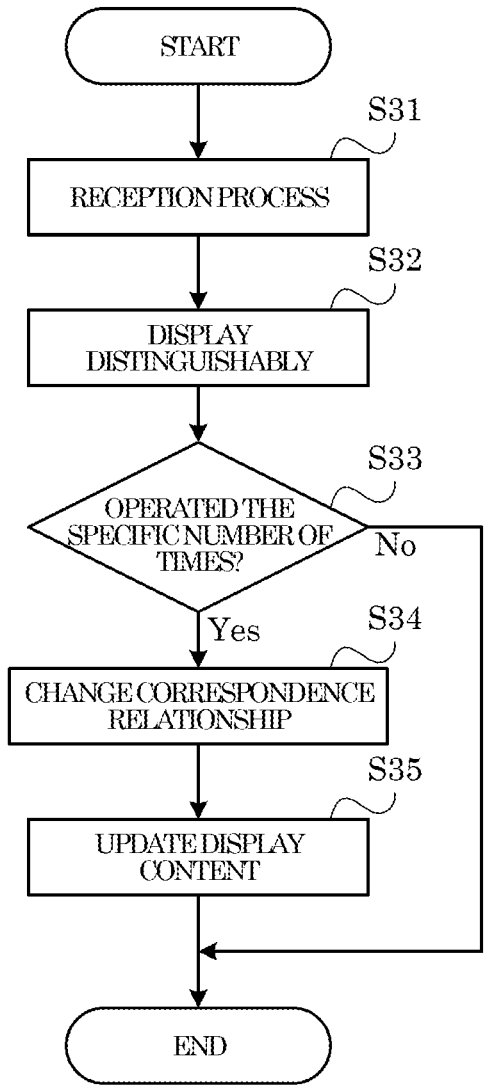
FIG. 6 is a flowchart showing an example of an input receiving process executed in the image processing apparatus according to the embodiment of the present disclosure.

Here, with reference to FIG. 6, the input receiving process executed in step S13 of the authentication process is described. It is noted that processing in step S14 and onward of the authentication process are described following the description of the input receiving process.

<Step S31>

First, in step S31, the control portion 5, based on the correspondence relationship information, receives the operation of an operation key G11X detected in step S12 of the authentication process as an input operation of a character corresponding to the operation key G11X. Here, the processing in step S31 is executed by the reception processing portion 52 of the control portion 5.

For example, the control portion 5 may identify the character corresponding to the operation key G11X detected in step S12 of the authentication process, based on the correspondence relationship information stored in the first storage area of the RAM. The control portion 5 then stores the identified character in the second storage area of the RAM.

<Step S32>

In step S32, the control portion 5 selects the character, whose input was received in step S31, from the plurality of characters included in the correspondence relationship information displayed on the input screen G10, and displays the character during the display time in a way that the character is distinguishable from the other characters. Here, the processing in step S32 is executed by the display processing portion 51 of the control portion 5.

For example, the control portion 5 may, during the display time, change the display density of the character whose input was received in step S31, and is included in the correspondence relationship information displayed on the input screen G10. This prevents the user from mistyping the password. It is noted that the processing in step S32 may be omitted.

<Step S33>

In step S33, the control portion 5 determines whether or not the operation key G11X has been operated the specific number of times.

For example, the control portion 5 may count each time the processing in step S31 is executed. When a count value reaches the specific number of times, the control portion 5 determines that the operation key G11X has been operated the specific number of times. It is noted that when the control portion 5 determines that the operation key G11X has been operated the specific number of times, the control portion 5 resets the count value to zero.

Here, when the control portion 5 determines that the operation key G11X has been operated the specific number of times (Yes in S33), the control portion 5 moves the process to step S34. In addition, when the operation key G11X has not been operated the specific number of times (No in S33), the control portion 5 ends the input receiving process.

<Step S34>

In step S34, the control portion 5 changes the correspondence relationship. Here, the processing in step S34 is executed by the change processing portion 54 of the control portion 5.

Specifically, the control portion 5 changes the correspondence relationship after the processing in step S32 is completed.

For example, the control portion 5 may change the correspondence relationship information stored in the first storage area of the RAM using random numbers such that the characters corresponding to the operation keys G11X are randomly selected.

<Step S35>

In step S35, the control portion 5 displays, on the input screen G10, the correspondence relationship information indicating the correspondence relationship after the change in step S34. Here, the processing in step S35 is executed by the display processing portion 51 of the control portion 5.

This concludes the description of the input receiving process, and the description of processing in step S14 and onward of the authentication process resumes below.

<Step S14>

In step S14, the control portion 5 determines whether or not a size changing operation for changing the display size of the correspondence relationship information on the input screen G10 has been detected. Specifically, when an operation to any one of the operation keys G15 and G16 has been detected, the control portion 5 determines that the size changing operation has been detected.

Here, when the control portion 5 determines that the size changing operation has been detected (Yes in S14), the control portion 5 moves the process to step S15. In addition, when the size changing operation has not been detected (No in S14), the control portion 5 moves the process to step S16.

<Step S15>

In step S15, the control portion 5 changes the display size of the correspondence relationship on the input screen G10 in response to the size changing operation detected in step S14. Here, the processing in step S15 is executed by the display processing portion 51 of the control portion 5.

For example, the control portion 5 may reduce, in response to an operation of the operation key G15, the display size of the correspondence relationship information displayed in the correspondence relationship information display portion G12. In addition, the control portion 5 enlarges, in response to an operation of the operation key G16, the display size of the correspondence relationship information displayed in the correspondence relationship information display portion G12. This allows the user to adjust the display size of the correspondence relationship information such that the correspondence relationship information is made difficult for a third party to view, within a range that does not impair visibility for the user.

<Step S16>

In step S16, the control portion 5 determines whether or not a density changing operation for changing the display density of the correspondence relationship information on the input screen G10 has been detected. Specifically, the control portion 5 determines that the density changing operation has been detected when an operation of any one of the operation keys G18 and G19 has been detected.

Here, when the control portion 5 determines that the density changing operation has been performed (Yes in S16), the control portion 5 moves the process to step S17. In addition, when the density changing operation has not been performed (No in S16), the control portion 5 moves the process to step S18.

<Step S17>

In step S17, the control portion 5 changes the display density of the correspondence relationship information on the input screen G10, in response to the density changing operation detected in step S16. Here, the processing in step S17 is executed by the display processing portion 51 of the control portion 5.

For example, the control portion 5 may reduce, in response to an operation of the operation key G18, the display density of the correspondence relationship information displayed in the correspondence relationship information display portion G12. In addition, the control portion 5 increases, in response to an operation of the operation key G19, the display density of the correspondence relationship information displayed in the correspondence relationship information display portion G12. This allows the user to adjust the display density of the correspondence relationship information such that the correspondence relationship information is made difficult for a third party to view, within a range that does not impair visibility for the user.

It is noted that some or all of the processing in steps S14 to S17 may be omitted.

<Step S18>

In step S18, the control portion 5 determines whether or not the confirmation operation for confirming input content on the input screen G10 has been detected. Specifically, when an operation of the login key G20 has been detected, the control portion 5 determines that the confirmation operation has been detected.

Here, when the control portion 5 determines that the confirmation operation has been detected (Yes in S18), the control portion 5 moves the process to step S19. In addition, when the confirmation operation has not been detected (No in S18), the control portion 5 moves the process to step S12.

<Step S19>

In step S19, the control portion 5 determines whether or not the user authentication is successful. Here, the processing in step S19 is executed by the determination processing portion 53 of the control portion 5.

Specifically, when the character string constituted by the characters stored in the second storage area of the RAM matches the password stored in the storage portion 7, the control portion 5 determines that the user authentication is successful.

Here, when the control portion 5 determines that the user authentication is successful (Yes in S19), the control portion 5 moves the process to step S191. In addition, when the user authentication fails (No in S19), the control portion 5 moves the process to step S20.

<Step S20>

In step S20, the control portion 5 displays a message on the operation display portion 6 indicating that the authentication has failed.

<Step S191>

In step S191, the control portion 5 executes the login process.

With this configuration, in the image processing apparatus 10, the correspondence relationship is changed each time the input operation is performed the specific number of times on the operation key G11X. This makes it difficult for a third party to guess the password from a user's hand movement, and from the correspondence relationship information displayed on the input screen G10, even in the case where the third party is behind the user inputting the password. Accordingly, leakage of the password to the third party from movement of the user's hand inputting the password is prevented.

OTHER EMBODIMENTS

Figure 7:
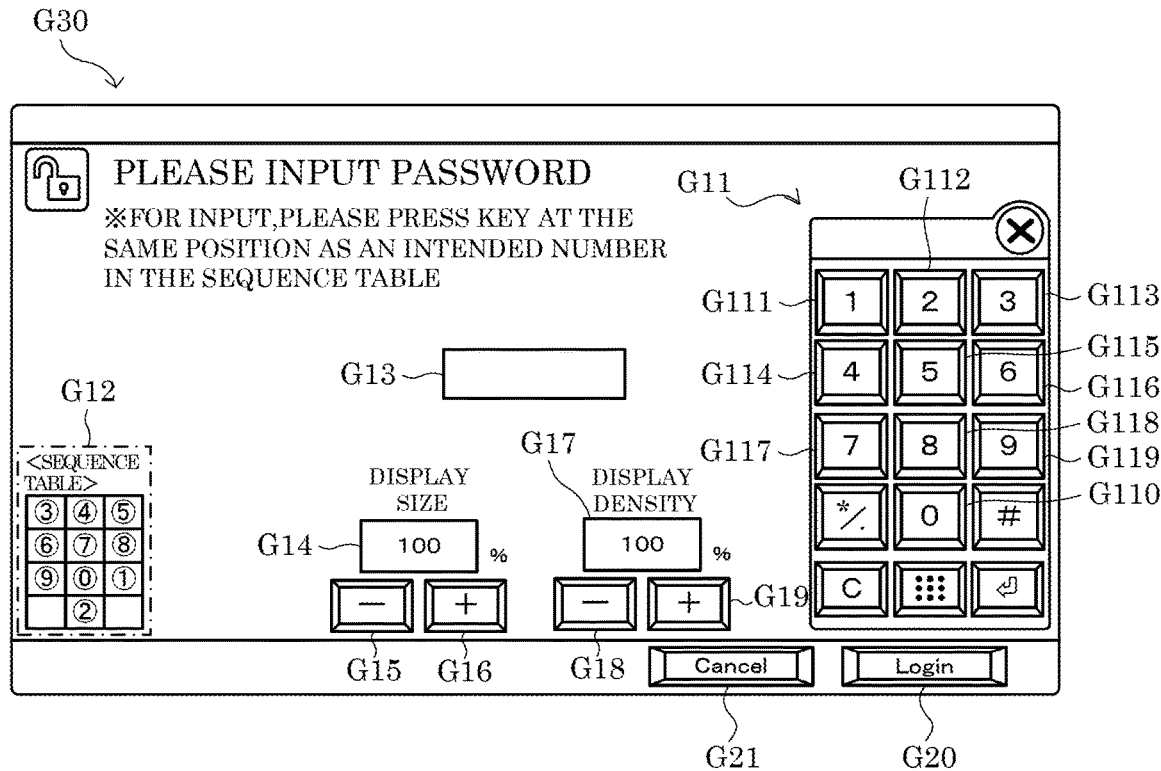
FIG. 7 is a diagram showing an example of an input screen displayed in an image processing apparatus according to another embodiment of the present disclosure.

It is noted that as in an input screen G30 shown in FIG. 7, the display processing portion 51 may display the operation key group G11 and the correspondence relationship information display portion G12, in which the correspondence relationship information is displayed, respectively at opposite end portions in a horizontal direction of the input screen G30. With this configuration, in comparison to a configuration in which the correspondence relationship information is positioned adjacent to the operation key group G11, it is difficult for a third party to grasp, at the same time, both the contents of the correspondence relationship information and hand movements of the user operating the operation key group G11, in the case where the third party is behind the user operating the image processing apparatus 10. It is noted that the input screen G30 shown in FIG. 7 is the same as the input screen G10 shown in FIG. 3, except that the components of the input screens G30 and G10 are arranged differently in position. Here, the input screen G30 is another example of the input screen in the present disclosure.

Figure 8:
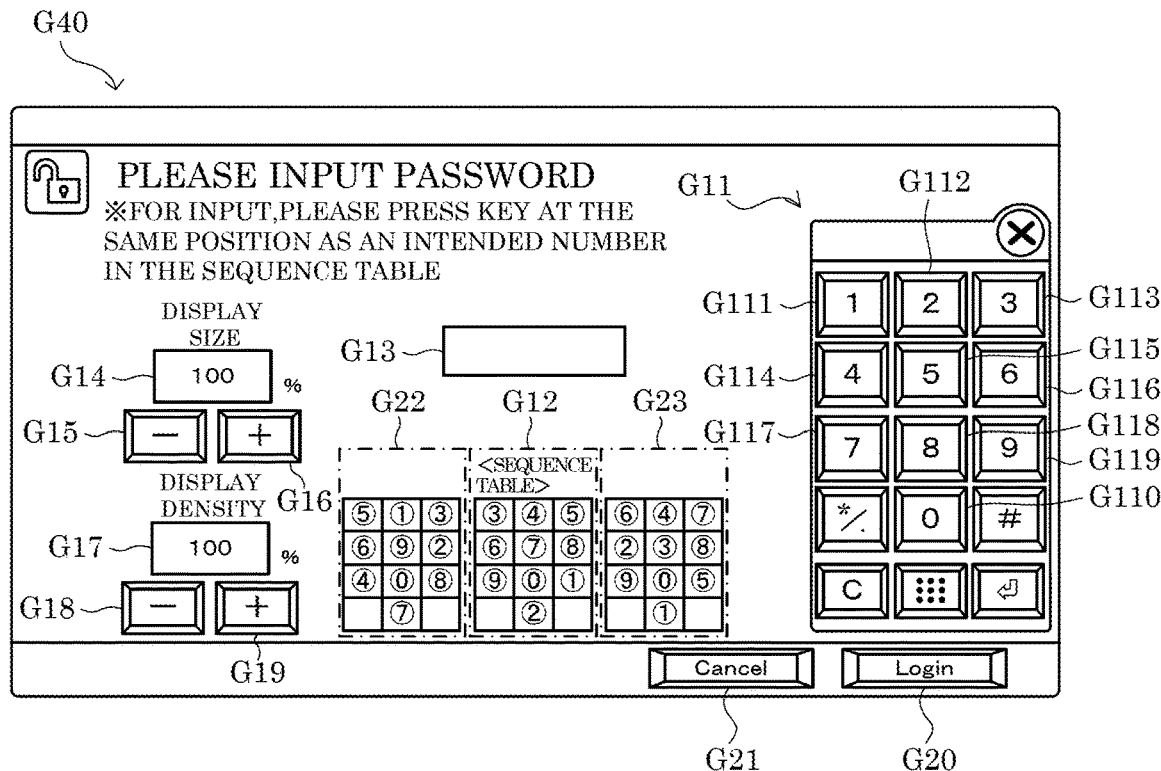
FIG. 8 is a diagram showing an example of an input screen displayed in an image processing apparatus according to another embodiment of the present disclosure.

In addition, as in an input screen G40 shown in FIG. 8, the display processing portion 51 may display a plurality of pieces of the correspondence relationship information, each indicating a different correspondence relationship, on the input screen G40. Here, on the input screen G40 shown in FIG. 8, dummy information display portions G22 to G23 are provided. The dummy information display portions G22 to G23 display correspondence relationship information indicating correspondence relationships different from the correspondence relationship information displayed in the correspondence relationship information display portion G12. It is noted that, except that the dummy information display portions G22 to G23 are added thereto, the input screen G40 shown in FIG. 8 is the same as the input screen G10 shown in FIG. 3. Here, the input screen G40 is another example of the input screen in the present disclosure.

In this case, the reception processing portion 52 receives an operation of the operation key G11X as an input operation of the character corresponding to the operation key G11X, based on the correspondence relationship information displayed in the correspondence relationship information display portion G12. Here, the correspondence relationship information displayed in the correspondence relationship information display portion G12 is an example of the first correspondence relationship information of the present disclosure.

In addition, when the input operation of the operation key G11X is performed the specific number of times, the change processing portion 54 changes each of the correspondence relationships displayed on the input screen G40. It is noted that the change processing portion 54 may change the correspondence relationships at the specific interval.

In addition, when the correspondence relationships are changed by the change processing portion 54, the display processing portion 51 interchanges display positions of the correspondence relationship information display portion G12 and any one of the dummy information display portions G22 and G23. It is noted that a predetermined recognition image (see FIG. 8 and FIG. 9) may be displayed within the correspondence relationship information display portion G12, such that the correspondence relationship information display portion G12 and the dummy information display portions G22 to G23 are distinguishable from one another. Here, each piece of the correspondence relationship information displayed in the dummy information display portions G22 to G23 are examples of the second correspondence relationship information in the present disclosure.

Figure 9:
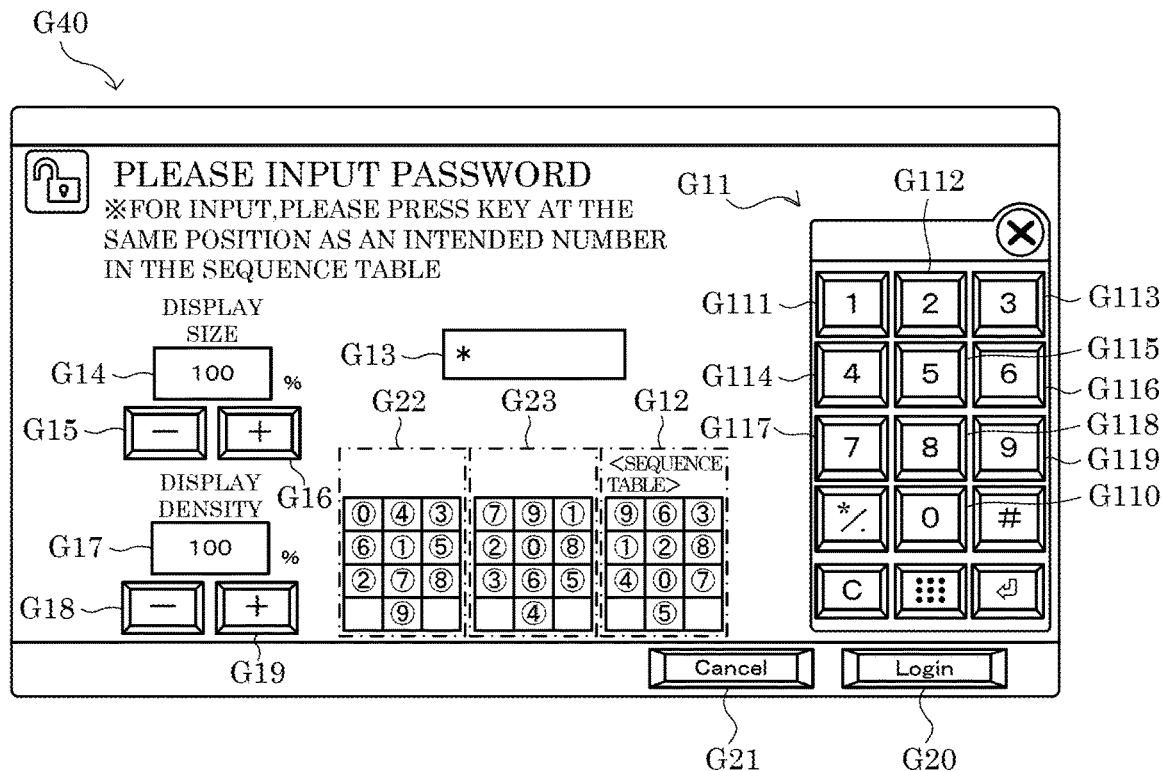
FIG. 9 is a diagram showing an example of an input screen displayed in an image processing apparatus according to another embodiment of the present disclosure.

FIG. 9 shows an example of changes of each of the correspondence relationships by the change processing portion 54. Specifically, following an operation of the operation keys G11X on the input screen G40 shown in FIG. 8, the input screen G40 shown in FIG. 9 is displayed. The input screen G40 shown in FIG. 9 is different from the input screen G40 shown in FIG. 8 in the display contents of the correspondence relationship information display portion G12 and the dummy information display portions G22 to G23, that is, the plurality of pieces of the correspondence relationship information. In addition, in the input screen G40 shown in FIG. 9, the positions of the correspondence relationship information display portion G12 and the dummy information display portion G23 are interchanged. With this configuration, in comparison to a configuration in which only one piece of the correspondence relationship information is displayed, it is difficult for a third party to grasp the content of the correspondence relationship information used for identifying the character input by an operation of the operation key G11X, in the case where the third party is behind the user operating the image processing apparatus 10.

It is noted that when the correspondence relationships are changed by the change processing portion 54, the change processing portion 54 may not interchange the display positions of the correspondence relationship information display portion G12 and any one of the dummy information display portions G22 to G23.

Figure 10:
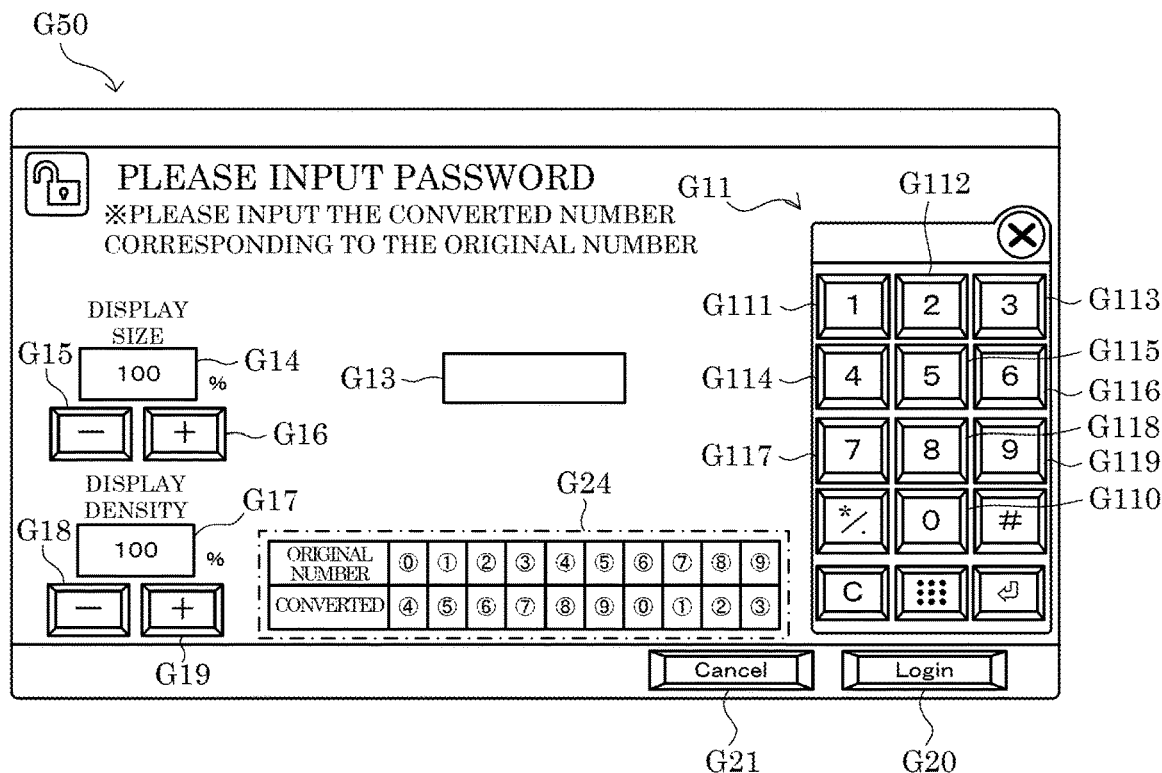
FIG. 10 is a diagram showing an example of an input screen displayed in an image processing apparatus according to another embodiment of the present disclosure.

In addition, as in an input screen G50 shown in FIG. 10, the correspondence relationship information may be in a tabular form indicating the correspondence relationship between the character displayed on the operation key G11X and the character that is input in response to an operation of the operation key G11X. It is noted that the input screen G50 shown in FIG. 10 is the same as the input screen G10 shown in FIG. 3, except for the following points: that a correspondence relationship information display portion G24 is provided instead of the correspondence relationship information display portion G12; and that the correspondence relationship information is displayed in the different form. Here, the input screen G50 is another example of the input screen in the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display input device, comprising:
a display processing portion configured to display an input screen used for inputting a password of a preset number of characters and display correspondence relationship information at a predetermined position on the input screen, the correspondence relationship information indicating a correspondence relationship between a plurality of characters and a plurality of operation keys used for inputting the password, the predetermined position being different from a position of the operation keys;
a reception processing portion configured to identify, based on the correspondence relationship information, a character that is input in response to an operation of any one of the operation keys; and
a change processing portion configured to change the correspondence relationship information when the operation of any one of the operation keys is performed a preset specific number of times that is less than the number of characters of the password, wherein
the display processing portion generates the correspondence relationship information when the input screen is displayed, and after the correspondence relationship information is changed by the change processing portion, the display processing portion displays the correspondence relationship information after the change on the input screen.

2. The display input device according to claim 1, wherein the display processing portion displays the correspondence relationship information horizontally centered and on a lower side in a vertical direction of the input screen.

3. The display input device according to claim 1, wherein the display processing portion displays the correspondence relationship information in an end portion of one side in a horizontal direction of the input screen, and displays the plurality of operation keys in an end portion of the other side in the horizontal direction of the input screen.

4. The display input device according to claim 1, wherein the display processing portion displays a plurality of pieces of the correspondence relationship information on the input screen, the plurality of pieces of the correspondence relationship information indicating different correspondence relationships,
the reception processing portion identifies a character that is input in response to the operation of any one of the operation keys, based on a piece of first correspondence relationship information that is one of the plurality of pieces of the correspondence relationship information, and
the change processing portion changes each of the plurality of pieces of the correspondence relationship information when the operation of any one of the operation keys is performed the preset specific number of times.

5. The display input device according to claim 4, wherein the display processing portion, when the correspondence relationships are changed by the change processing portion, interchanges display positions of the piece of first correspondence relationship information and any piece of a second correspondence relationship information, different from the first correspondence relationship information, included in the plurality of pieces of the correspondence relationship information.

6. The display input device according to claim 1, wherein the display processing portion, in response to a user operation, changes either or both of a display size and a display density of the correspondence relationship information displayed on the input screen.

7. The display input device according to claim 1, wherein the display processing portion, in response to a user operation, changes either or both of a display size and a display density of the operation keys displayed on the input screen.

8. The display input device according to claim 1, wherein when the any one of the operation keys is operated, the display processing portion displays, during a preset display time, the character corresponding to the any one of the operation keys included in the correspondence relationship information displayed on the input screen in a way that the character is distinguishable from the other characters.

9. An information processing apparatus, comprising: the display input device according to claim 1.

10. A display input method comprising:
displaying an input screen used for inputting a password of a preset number of characters and displaying correspondence relationship information at a predetermined position on the input screen, the correspondence relationship information indicating a correspondence relationship between a plurality of characters and a plurality of operation keys used for inputting the password, the predetermined position being different from a position of the operation keys;
identifying, based on the correspondence relationship information, a character that is input in response to an operation of any one of the operation keys; and
changing the correspondence relationship information when the operation of any one of the operation keys is performed a preset specific number of times that is less than the number of characters of the password, wherein
the correspondence relationship information is generated when the input screen is displayed, and after the correspondence relationship information is changed, the correspondence relationship information after the change is displayed on the input screen.

* * * * *